United States Patent [19]

Ma et al.

[11] Patent Number: 6,128,151
[45] Date of Patent: Oct. 3, 2000

[54] METHOD AND A SYSTEM FOR ENGAGING A DISK DRIVE SPINDLE MOTOR WITH A DISK CARTRIDGE

[75] Inventors: Yiping Ma, Layton; Klinton D. Washburn, Roy, both of Utah

[73] Assignee: Iomega Corporation, Roy, Utah

[21] Appl. No.: 08/960,134

[22] Filed: Oct. 29, 1997

[51] Int. Cl.$^7$ .............................. G11B 19/26; G11B 19/20
[52] U.S. Cl. ................................... 360/73.03; 360/73.01; 360/69
[58] Field of Search .................................. 360/69, 73.03, 360/73.01, 71

[56] References Cited

U.S. PATENT DOCUMENTS

| | | | |
|---|---|---|---|
| 4,376,293 | 3/1983 | Teramura et al. | 360/71 |
| 4,419,703 | 12/1983 | Gruczelak et al. | 360/99.06 |
| 4,482,993 | 11/1984 | Agostini | 369/263 |
| 4,532,564 | 7/1985 | Larson et al. | 360/97 |
| 4,571,646 | 2/1986 | Bauck et al. | 360/99.09 |
| 4,599,769 | 7/1986 | Latzko et al. | 29/26 A |
| 4,625,247 | 11/1986 | Saito et al. | 360/73.03 |
| 4,644,521 | 2/1987 | Davis et al. | 369/291 |
| 4,656,542 | 4/1987 | Shibata | 360/99.02 |
| 4,663,677 | 5/1987 | Griffith et al. | 360/71 |
| 4,683,506 | 7/1987 | Toldi et al. | 360/105 |
| 4,745,500 | 5/1988 | Davis | 360/97.01 |
| 4,823,214 | 4/1989 | Davis | 360/97.01 |
| 4,953,042 | 8/1990 | Yoshikawa | 360/96.5 |
| 5,025,436 | 6/1991 | Crain et al. | 369/77.2 |
| 5,053,903 | 10/1991 | Harney et al. | 360/99.06 |
| 5,056,078 | 10/1991 | Carey et al. | 369/77.2 |
| 5,107,484 | 4/1992 | Kawamura et al. | 369/244 |
| 5,204,793 | 4/1993 | Plonczak | 360/97.01 |
| 5,317,464 | 5/1994 | Witt et al. | 360/99.08 |
| 5,501,760 | 3/1996 | Mukawa | 156/305 |
| 5,583,710 | 12/1996 | Nicklos et al. | 360/71 |
| 5,617,397 | 4/1997 | Jones et al. | 369/772 |

FOREIGN PATENT DOCUMENTS

| | | |
|---|---|---|
| 0 747 897 A2 | 12/1996 | European Pat. Off. . |
| 61-77160 | 4/1986 | Japan . |
| 3-237653 | 10/1991 | Japan . |
| WO 93/18507 | 9/1993 | WIPO . |

OTHER PUBLICATIONS

U.S. application No. 08/560,869, Ma et al., filed Nov. 20, 1995.

U.S. application No. 08/656,718, Nicklos et al., filed Jun. 03, 1996.

U.S. application No. 08/699,471, Jones et al., filed Aug. 19, 1996.

U.S. application No. 08/866,177, Nicklos et al., May 30, 1997.

Minico ® M 2000 RS Carbon Potentiometer Resistor Series Technical and Safety Data Sheets, W.R. Grace & Co., 1994.

*Primary Examiner*—William Klimowicz
*Attorney, Agent, or Firm*—Woodcock Washburn Kurtz Mackiewicz & Norris LLP

[57] ABSTRACT

A method of this invention includes engaging a disk drive spindle motor with a disk cartridge. This method may include inserting a disk cartridge into a disk drive. After the disk cartridge has been inserted, the method may include rotating the spindle motor at a speed that is less than a critical speed and engaging the spindle motor with the disk cartridge at a speed that is less than the critical speed. After the spindle motor is engaged with the disk cartridge, the method of this invention may further include rotating the disk drive motor and thereby rotating the storage medium disposed within the disk drive at its operational speed. In order to accomplish this method, the system of this invention may include a microprocessor coupled to the disk drive spindle motor and a computer readable storage device. Preferably, this storage device contains programmed code and data for controlling the microprocessor to rotate the spindle motor at a speed that is less than a critical speed so that when the spindle engages the hub of the disk cartridge, the hub moves to a centered position with respect to the spindle.

26 Claims, 6 Drawing Sheets

METHOD AND A SYSTEM FOR ENGAGING A DISK DRIVE SPINDLE MOTOR WITH A DISK CARTRIDGE

BACKGROUND OF THE INVENTION

This invention relates to a system and a method for engaging a disk drive spindle motor with a disk cartridge.

Disk drives for storing electronic information are found in a wide variety of computer systems, including workstations, personal computers, laptop and notebook computers. Such disk drives can be stand-alone units that are connected to a computer system by a cable, or they can be internal units that occupy a slot, or bay, in a computer system. Laptop and notebook computers have relatively small bays in which to mount internal disk drives and other peripheral devices, as compared to the much larger bays available in most workstation and personal computer housings. The relatively small size of peripheral bays found in laptop and notebook computers, can place significant constraints on the designer of internal disk drives for use in such computers. Techniques that address and overcome the problems associated with these size constraints are therefore important.

Disk drives of the type that accept removable disk cartridges have become increasingly popular. One disk drive product that has been very successful is the ZIP™ drive designed and manufactured by Iomega Corporation, the assignee of the present invention. ZIP™ drives accept removable disk cartridges that contain a flexible magnetic storage medium upon which information can be written and read. The disk-shaped storage medium is mounted on a hub that rotates freely within the cartridge. A spindle motor within the ZIP™ drive engages the cartridge hub when the cartridge is inserted into the drive, in order to rotate the storage medium at relatively high speeds. The spindle motor does this by first moving from an unloaded position to a loaded position when a disk cartridge is inserted into the disk drive. In the loaded position, the spindle of the disk drive motor contacts the hub of the disk cartridge. The spindle can then be rotated in order to rotate the hub and the storage medium of the disk cartridge.

A shutter on the front edge of the cartridge is moved to the side during insertion into the drive, thereby exposing an opening through which the read/write heads of the drive move to access the recording surfaces of the rotating storage medium. The shutter covers the head access opening when the cartridge is outside of the drive, to prevent dust and other contaminants from entering the cartridge and settling on the recording surfaces of the storage medium.

The ZIP™ drive is presently available for workstations and personal computers in both stand-alone and internal configurations. In order to provide a version of the ZIP™ drive for use in laptop and notebook computers, the size constraints of the peripheral bays of such computers must be considered. In particular, for an internal drive to fit in the majority of laptop and notebook peripheral bays, the drive must be no longer than 135 mm. The height of the drive must be in the range of 12 to 15 mm. These dimensions place many constraints on the design of such a drive and give rise to numerous design problems. The present invention addresses and overcomes some of the problems presented in designing a disk drive to these specifications.

Because of these constraints on the size of a disk drive, the distance between the spindle of the disk drive motor and the hub of a disk cartridge has become relatively small. In fact, the distance between these components has become so small that the height and consequently the shape of the spindle of the disk drive motor has been changed. For example, in the ZIP™ drive the spindle of the disk drive motor had a conical shape that permitted it to smoothly engage the hub of the disk cartridge. Because of the design constraints on the height of the spindle, the spindle has been designed in shapes other than a conical shape. In one design, the spindle was formed in a dome shape. Because of this different shape, the disk drive motor may not properly engage the hub of the disk cartridge when the two come into contact. Experience has shown that with the change in the shape of the spindle of the disk drive motor, the spindle will not properly engage the hub of the disk cartridge when it is rotating at or above certain speeds.

This invention includes an improved method and an improved system for operating the newly shaped spindle motor to ensure that it properly engages the hub of a disk cartridge.

SUMMARY OF THE INVENTION

A method of this invention includes engaging a disk drive spindle motor with a disk cartridge. This method may include inserting a disk cartridge into a disk drive. After the disk cartridge has been inserted, the method may include rotating the spindle motor at a speed that is less than a critical speed and engaging the spindle motor with the disk cartridge at a speed that is less than the critical speed. After the spindle motor is engaged with the disk cartridge, the method of this invention may further include rotating the disk drive motor and thereby rotating the storage medium disposed within the disk drive at its operational speed.

The method of this invention may further include the steps of moving the disk drive spindle motor from an unloaded position to a loaded position. Before a disk cartridge is inserted into the disk drive, the spindle motor rests in an unloaded position. When the disk cartridge is inserted into the disk drive, the spindle motor moves to a loaded position in which the spindle contacts the hub of the disk cartridge. Preferably, the disk drive spindle motor moves to its loaded position in response to operation of an eject lever disposed within the disk drive. For instance, as the disk cartridge is inserted, it may push the eject lever. As the eject lever moves, it may move a linkage, which causes the spindle motor to move to the loaded position.

When the disk drive motor is in the loaded position, the spindle of the disk drive motor is inserted into a hub of the disk cartridge. If the spindle is not centered within the hub, the spindle will not properly rotate the hub. In order to center the hub over the spindle, the disk drive motor may have a magnet and the spindle motor may be rotated or spun up according to a preferred method of this invention. The magnet of the disk drive motor exerts a force which pulls the hub to a centered position. However, due to friction between the hub and the spindle, the hub may not be able to move to this centered position. In order to overcome the friction force and allow the magnet to move the hub to the centered position so that the spindle can properly engage the hub, the spindle is rotated according to a preferred method of this invention.

In a preferred method, the spindle is rotated and then a braking force is applied to the spindle motor. Preferably, this braking force is a dynamic braking force. Because of the breaking force, the spindle will slow down. While the spindle is rotating, the friction force between the hub and the spindle decreases and the magnetic force of the magnet overcomes the friction force and moves the hub to the centered position. By slowing the spindle motor, the centrifugal force exerted by the rotation of the spindle is decreased, so that the centrifugal force does not prevent the magnetic force from centering the hub. If the motor was not slowed and was spun up rapidly as in prior art spin up routines, the centrifugal force from the rotation of the spindle may prevent the magnetic force from moving the hub to the centered position. In fact, experience has shown that if the hub is not centered and the spindle is spun up relatively quickly, the hub may not move to the centered position. If the hub is not centered with respect to the spindle, the spindle will contact the hub intermittently and rotate it in a wobbly fashion similar to a "hula-hoop."

It has been observed that there is a speed above which the centrifugal force is great enough so that the magnet will not center the hub. This speed may be referred to as the critical speed.

In another preferred embodiment, the hub is moved to a centered position by rotating the spindle at a predetermined speed, which is less than the critical speed, for a predetermined period of time. By rotating the disk drive motor at this lower speed, the magnet moves the hub to the centered position. As the hub moves to a centered position, the spindle properly engages the hub. This may include the spindle entering an aperture in the disk cartridge to properly engage the hub.

This system of this invention may include a microprocessor, a disk drive motor coupled to the microprocessor and a computer readable storage device containing programmed code and data. The storage device preferably contains code and data for controlling the microprocessor to rotate the spindle motor. Furthermore, the storage device may contain programmed code and data for rotating the disk drive motor at a speed that is less than a critical speed, so that the hub moves to a centered position with respect to the spindle. As the hub moves to a centered position, the spindle properly engages the hub.

In a preferred embodiment of this system, the storage device contains programmed code and data for rotating the spindle motor and then applying a braking force to the spindle motor. Preferably, the storage device contains programmed code and data for applying a dynamic braking force to the spindle motor.

In an alternative preferred embodiment of this system, the storage device contains programmed code and data for rotating the spindle of the disk drive motor at a predetermined speed that is less than the critical speed for a predetermined period of time.

The disk cartridge may have an aperture into which the hub extends. When the disk drive motor is in the loaded position, the spindle should extend into this aperture. The spindle will properly rotate the hub when it is in the aperture. Due to dimensional tolerances, the spindle may not enter the aperture when it moves to the loaded position. If the spindle does not enter the aperture, the spindle will not rotate the hub properly. By permitting the hub to move to a centered position with respect to the spindle, this invention ensures that when the spindle is rotated or "spun up" it will enter the aperture as the hub moves towards the centered position and properly rotate the hub once it is in the aperture.

Other features of the present invention are described below.

DETAIL DESCRIPTION OF PREFERRED EMBODIMENTS

Figure 1:
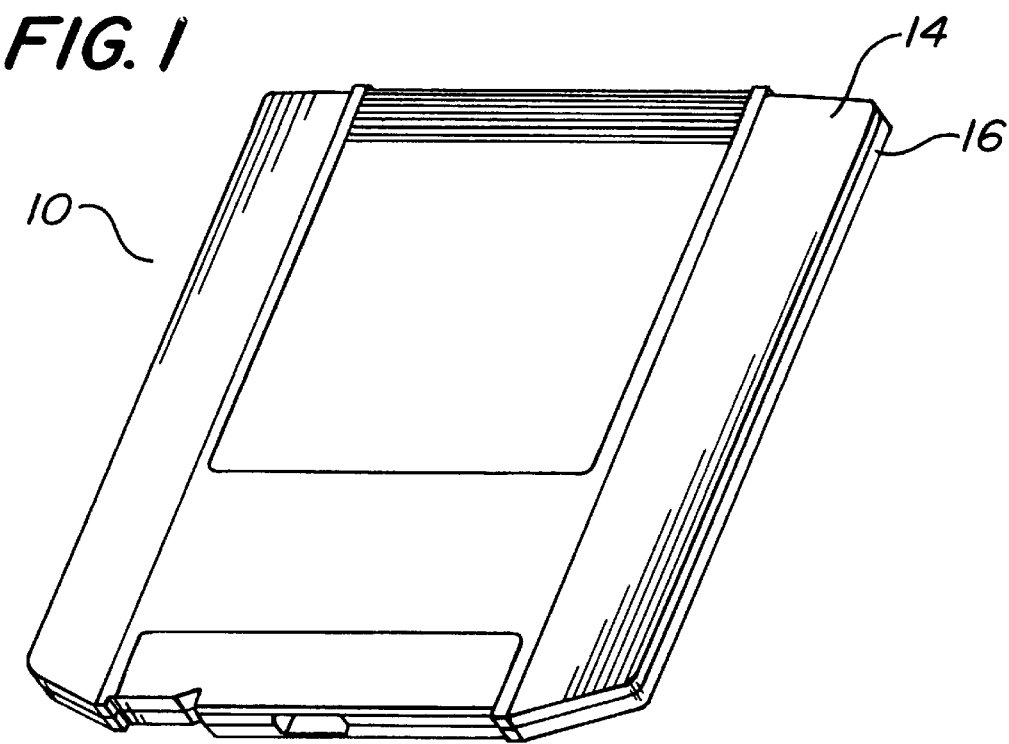
FIG. 1 is a top view of a disk cartridge that can be used with a preferred embodiment of this invention.
Figure 2:
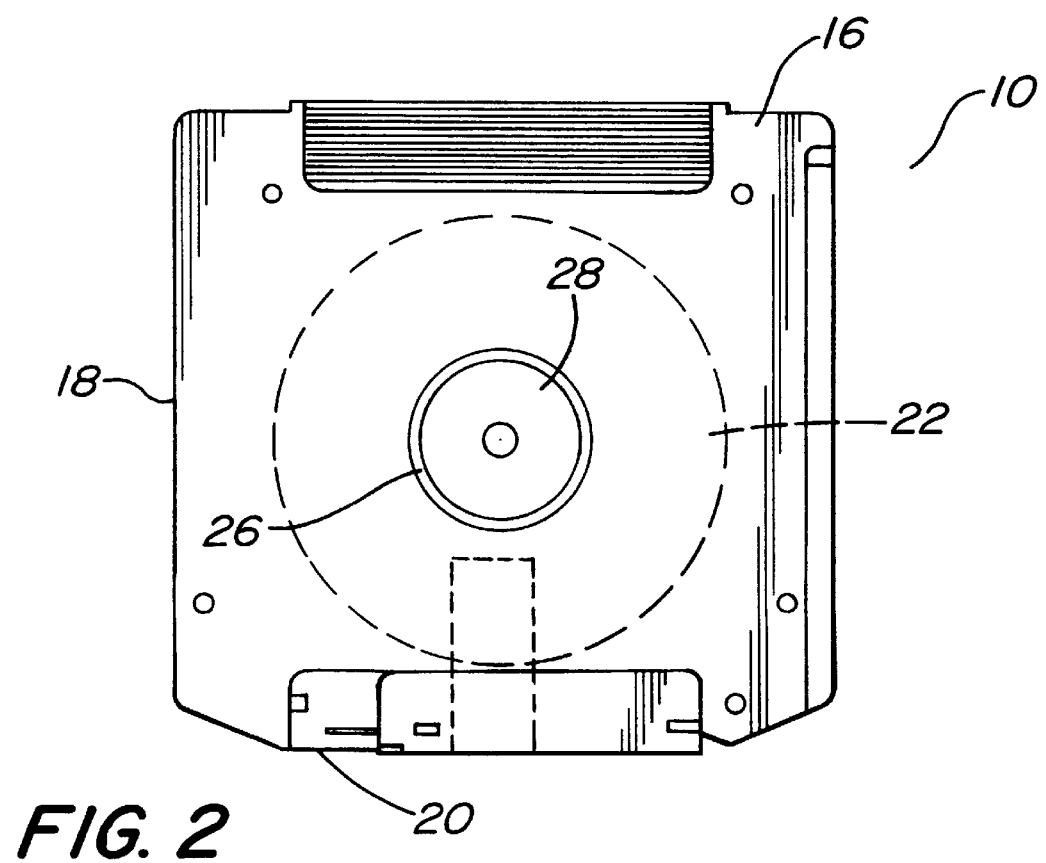
FIG. 2 is a bottom view of a disk cartridge that can be used with a preferred embodiment of this invention.

FIGS. 1 and 2 depict an exemplary disk cartridge 10 adapted for use in the disk drive 12 of this invention. In a preferred embodiment, the disk cartridge 10 may be a ZIP™ disk cartridge produced by Iomega Corporation. However, the disk drive 12 of this invention is not limited to these disk cartridges and a variety of other standard disk cartridges may be employed. As shown, the exemplary disk cartridge 10 has an upper and a lower shell 14, 16 that mate to form an outer casing 18. In a preferred embodiment, the shells 14, 16 are plastic. A head opening 20 in the front peripheral edge of the disk cartridge 10 provides access to the surfaces of the storage medium 22 for the read/write heads 24 of the disk drive 12. Rotatably mounted in the casing 18 is a hub 26. Preferably, the hub 26 is manufactured from a magnetic material. A disk shaped information storage medium 22 is affixed to the hub 26. Since the storage medium 22 is affixed to the hub 26, rotation of the hub 26 will cause rotation of the storage medium 22. In a preferred embodiment, the storage medium 22 is a flexible magnetic storage medium 22. However, in other embodiments, the storage medium 22 may be a rigid magnetic disk, a magneto-optical disk or an optical storage medium 22. An aperture 28 in the lower shell 16 of the casing 18 provides access to the disk hub 26.

Figure 8:
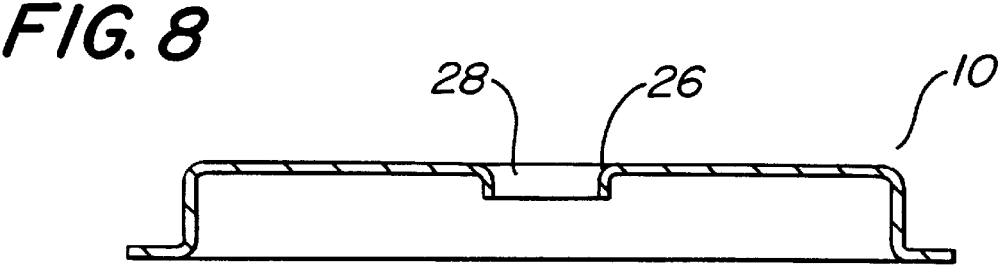
FIG. 8 is a cross sectional view of a portion of the disk cartridge of FIG. 1.

FIG. 8 depicts a cross-sectional view of the disk cartridge 10. As is more clearly shown in this Figure, the aperture 28 is disposed in the lower shell 16 of the disk cartridge 10, and the hub 26 is disposed within the aperture 28.

Figure 3:
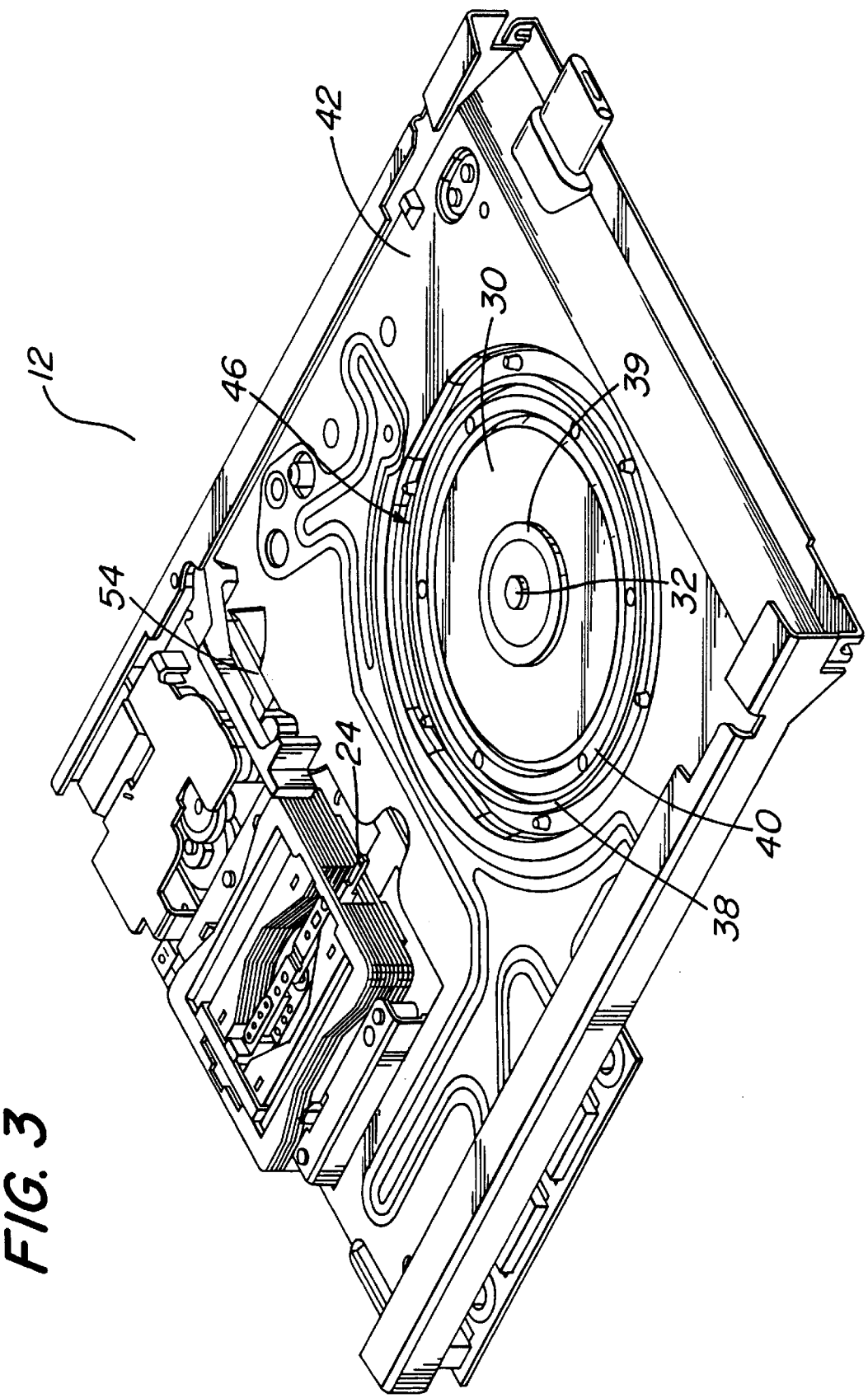
FIG. 3 is an isometric view of a disk drive that can be used with a preferred embodiment of this invention.
Figure 4:
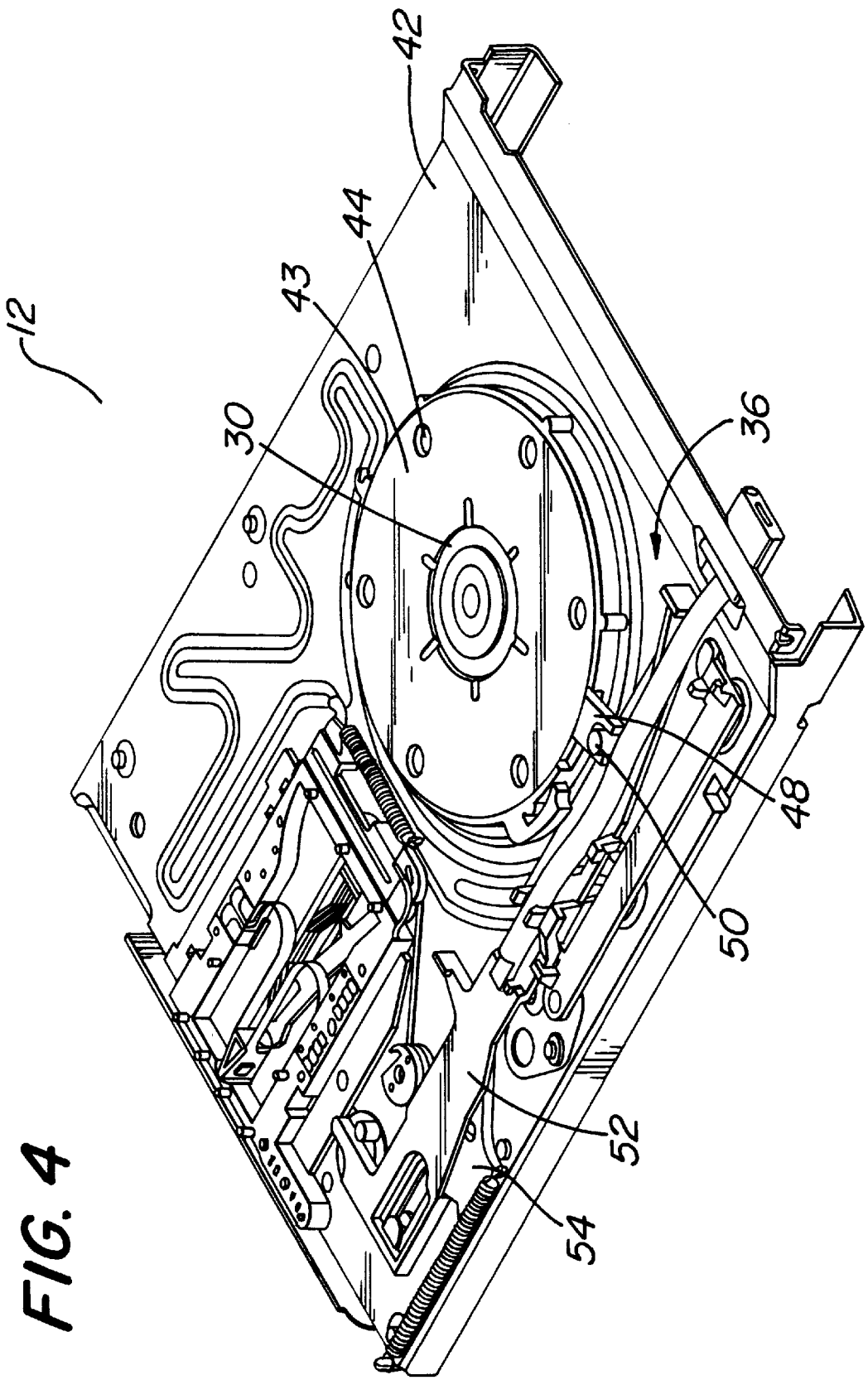
FIG. 4 is an isometric view of the disk drive of FIG. 3.
Figure 7:
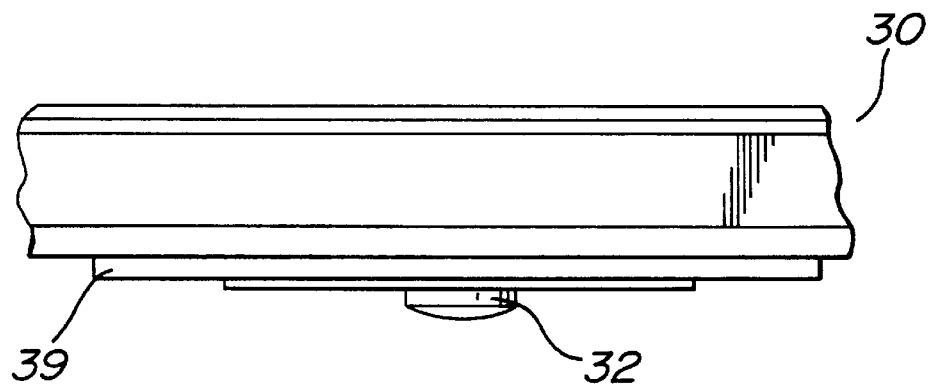
FIG. 7 is a diagrammatical view of a disk drive spindle motor that can be used with a preferred embodiment of this invention.
Figure 10:
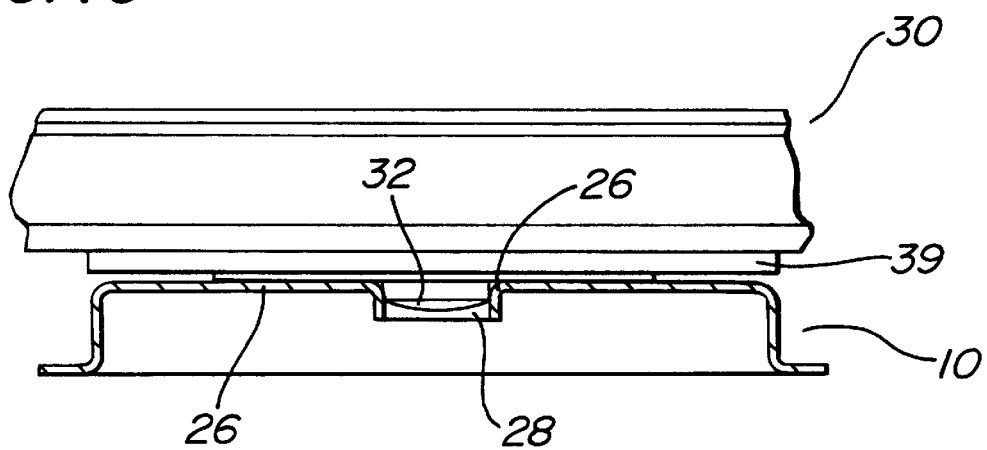
FIG. 10 is a diagrammatical view of disk drive motor that is properly engaged with a hub of a disk drive.

As can be seen in the disk drive 12 illustrated in FIGS. 3 and 4, a disk drive 12 typically has a disk drive motor 30 for engaging the hub 26 of the disk cartridge 10 and rotating the hub 26 and the storage medium 22. The disk drive 12 shown is of the type employed in a laptop type computer. However, the method and the system 34 of this invention can be used with any type of disk drive, including stand alone disk drives and disk drives included within a casing, a slot or a bay, such as in an office type computer. As depicted in FIG. 3, the disk drive motor 30 may include a spindle 32 upon which the motor 30 rotates. This spindle 32 extends above the disk drive motor 30 to engage the hub 26 of the disk cartridge 10. In this disk drive 12, the top of the spindle 32 takes the form of a dome, as is illustrated in FIG. 7. By examining FIGS. 7 and 8, it is apparent that the spindle 32 of the disk drive motor 30 can fit within the aperture 28. When disposed within the aperture 28, the spindle 32 contacts the hub 26, as shown in FIG. 10. As described below, the spindle 32 can be rotated, and therefore, rotation of the spindle 32 when engaged with the hub 26 will cause rotation of the hub 26 and the storage medium 22. The operation of the spindle motor 30 is more clearly explained in commonly assigned co-pending U.S. patent application Ser. No. 08/866,177, now U.S. Pat. No. 6,002,547, filed on May 30, 1997 and entitled "Motor Loading System For A Disk Drive," which is hereby incorporated by reference.

By way of background and so that the method and system 34 of this invention can be more readily understood, an overview of the operation of the motor loading system 36 of the disk drive 12 is provided. The motor loading system 36 may have an inner motor ring 38 disposed on the disk drive motor 30, a magnet 39 and an outer motor ring 40 disposed on the chassis 42 of the disk drive 12. The primary function of these rings is to engage the disk drive motor 30 with a disk cartridge 10 when loaded into the disk drive 12, and to disengage the disk drive motor 30 from a disk cartridge 10 so that the cartridge 10 can be ejected from the disk drive 12. As is described below, the magnet 39 cooperates with the hub 26 so that the spindle 32 of the spindle motor 30 properly engages the hub 26.

A cover plate 43 may be affixed to the lower portion of the disk drive motor 30, as shown in FIG. 4. The inner motor ring 38 may have threads running around its circumference. This inner motor ring 38 is preferably constructed from plastic or another suitable material. The inner motor ring 38 may be connected to the cover plate with heat stakes 44, as shown in FIG. 4. Alternatively, fasteners, adhesives or a variety of other fastening techniques may be employed.

The threads of the inner motor ring 38 are adaptable to mate with a threaded outer motor ring 40 disposed in a cavity 46 in the chassis 42. The inner motor ring 40 is also preferably constructed from plastic or another suitable material.

Extending from the inner motor ring 38 may be a slotted member 48. The slotted member 48 extends approximately parallel to the chassis 42 and interacts with a drag link post 50 extending from the drag link 52 to load and unload the disk drive motor 30. Movement of the drag link 52 is controlled by movement of the eject lever 54. As shown, the eject lever 54 has a portion disposed above the chassis 42 and a portion disposed below the chassis 42. The portion below the chassis 42 controls the operation of the drag link 52.

When a disk cartridge 10 is not inserted into the disk drive 12, the disk drive motor 30 rests in an unloaded position. In the unloaded position, the disk drive motor 30 is recessed into the cavity 46 in the chassis 42. When a disk cartridge 10 is inserted into the disk drive 12, the disk drive motor 30 can then be moved to its loaded position, as shown in FIG. 10. In order to move from the unloaded position to the loaded position, the disk drive motor 30 translates upward by moving in a screw like pattern toward the chassis 42 and engages the disk cartridge 10 to rotate its storage medium 22. In the loaded position, the spindle 32 engages the hub 26 of the disk cartridge 10. When the disk cartridge 10 is ejected from the disk drive 12, the disk drive motor 30 disengages from the disk cartridge 10 and moves back to its unloaded position.

In further detail, the loaded position of the disk drive motor 30, the inner motor ring 38, the outer motor ring 40, and the slotted member 48 are depicted in FIGS. 3 and 4. The disk drive motor 30 can be moved from the unloaded position to this loaded position as follows. When a disk cartridge 10 is inserted into a disk drive 12, the eject lever 54 is pushed and rotates to its spring loaded position, as shown in FIGS. 3 and 4. As the eject lever rotates, the drag link 52 is released and translates towards the front of the disk drive 12 to the position shown in FIG. 4. As the drag link 52 translates, the drag link post 50 pushes the slotted member 48 and drives the inner motor ring 38 to rotate in a clockwise direction, as depicted in FIG. 3, and a counter clockwise direction as viewed in FIG. 4. Upon rotating with the inner motor ring 38, the disk drive motor 30 is driven towards the top of the disk drive 12 into its loaded position. In the loaded position, the spindle 32 of the disk drive motor 30 enters the aperture 28 and contacts the hub 26 of the disk cartridge 10, as is best understood by examining FIGS. 7, 8 and 10. Thus, when a disk cartridge 10 is inserted into the disk drive 12, the spindle motor 30 is driven in a screw like pattern transverse to the chassis 42 so that the spindle 32 can enter the aperture 28 and engage the hub 26 of the disk cartridge 10, as shown in FIG. 10.

As described above, in the loaded position the spindle 32 enters the aperture 28, and the spindle 32 of the disk drive motor 30 can, in addition to moving with the disk drive motor 30 in a direction transverse to the chassis 42, rotate. Rotation of the spindle 32 is controlled by a microprocessor 56, which is in turn controlled by a computer memory or storage device 58 that contains programmed code and data. This memory may be read only memory (ROM). After a disk cartridge 10 has been inserted into the disk drive 12, the microprocessor 56 sends power to the motor 30 to cause the disk drive motor 30, and in particular the spindle 32, to rotate. This occurs after the disk drive motor 30 has moved to its loaded position. This is commonly referred to as motor "spin-up."

Figure 9:
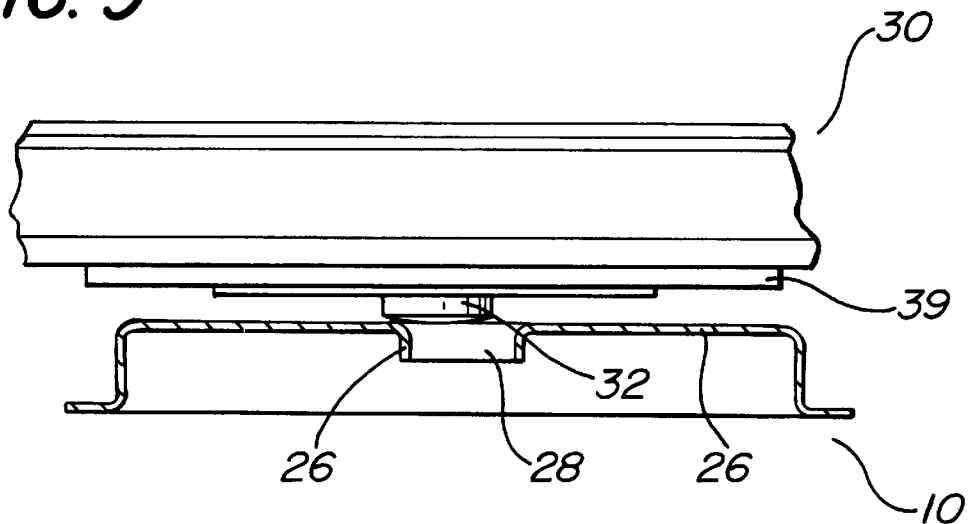
FIG. 9 is a diagrammatical view of disk drive motor that is not properly engaged with a hub of a disk drive.

In order for the spindle to rotate the hub 26 properly the spindle 32 must be centered in the aperture 28 shown in FIG. 8 and as shown in FIG. 10. If the spindle 32 is not centered and does not enter the aperture 28, the spindle 32 will contact the hub 26 as it rotates and cause the hub 26 and the attached storage medium to rotate in an unstable pattern, similar to a "hula-hoop" that is not rotating in a continuous circular pattern. This is commonly referred to as the hula-hoop effect. This can best be understood with reference to FIG. 9. FIG. 9 illustrates the spindle 32 when it has been moved by the microprocessor towards the loaded position, but has not entered the aperture 28 because the spindle 32 and the aperture 32 were not properly aligned. When the spindle 32 is rotated in this position, the spindle 32 will not properly rotate the hub 26. Rather, the spindle 32 will contact the hub 26 disposed outside of the aperture 28 and cause the hub 26 and its attached storage medium to rotate similar to a hula-hoop. Variations in dimensions of the components of the disk drive may cause the spindle 32 to not enter the aperture 28 as it moves to the loaded position and engage the hub 26 similar to the manner shown in FIG. 9.

Figure 6:
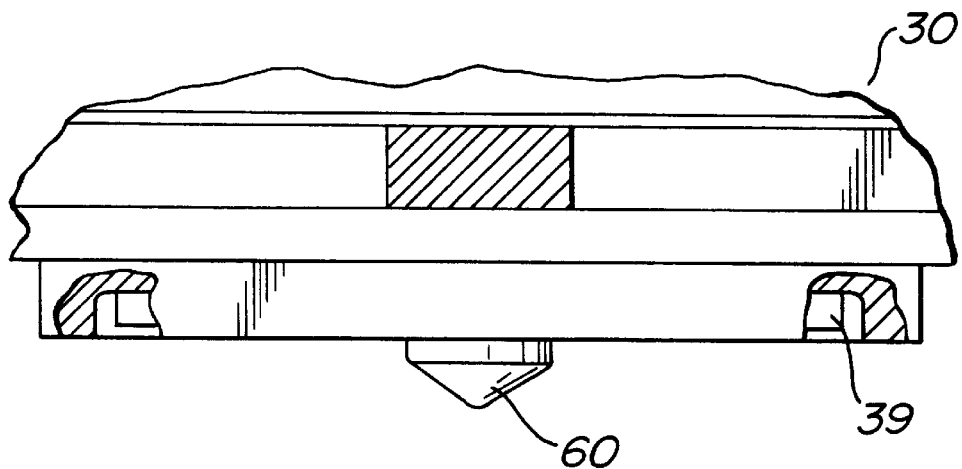
FIG. 6 is a diagrammatical view of a prior art spindle motor.

A prior art design of a disk drive motor 30, that has a conical shaped spindle 60, is illustrated in FIG. 6. This disk drive motor 30 operates similar to that described above. For instance, this disk drive motor 30 moves from an unloaded position to a loaded position to engage a hub 26 of a disk cartridge 10. In addition, the disk drive motor 30 is operated by a microprocessor 56 and a computer programmable memory code in order to spin up the motor. As can be seen from FIG. 6, however, this disk drive motor 30 has a conical shaped spindle 60.

Figure 5:
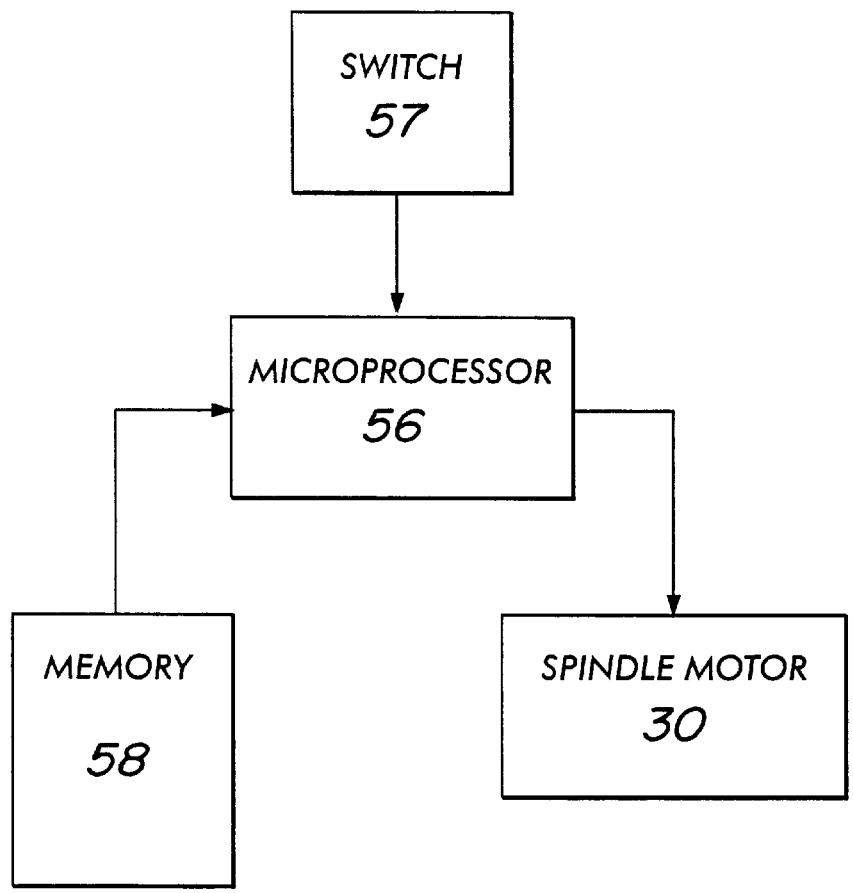
FIG. 5 is a schematic diagram of a preferred embodiment of the system of this invention.

If when the disk drive motor 30 moves to the loaded position, the conical shaped spindle 60 is centered in the hub 26, the conical shaped spindle will cause the hub to rotate properly when the spindle 60 is rotated by the microprocessor. However, due to dimensional tolerances the spindle 60 may not enter the aperture 28 and be centered within the hub 26. Similar to the dome shaped spindle 32, if the conical spindle 60 is not centered, the conical spindle 60 will not enter the aperture 28 and will not cause the hub 26 to rotate properly. Although this is not shown in the drawings, it can be visualized by replacing the dome shaped spindle 32 of FIG. 10 with the conical shaped spindle 60 of FIG. 5. In this position, the conical surface of the spindle 60 rests against the portion of the hub 26 extending from the aperture.

In this prior art design, the magnet 39 and the shape of the spindle 60 ensure that the spindle is centered in the hub 26. As mentioned above, the hub 26 preferably comprises a magnetic material. Because of the orientation of the disk cartridge when it is inserted into the disk drive, the magnet 39 of the disk drive motor 30 exerts a force pulling the hub 26 to center it over the magnet and the spindle so that the spindle can enter the aperture 28. If the spindle 60 is not centered and has not entered the aperture 28, the hub 26 will contact the spindle 60 and thereby create a friction force between the spindle and the hub 26. This friction force may be greater than the magnetic force. This friction force is a function of the shape of the spindle 60. If the friction force is greater than the magnetic force, the friction force will prevent the hub 26 from moving and becoming centered over the spindle 60 so that the spindle can enter the aperture 28. Because the spindle 60 has not yet been rotated, the friction force exerted is a static friction force. When the spindle 60 is rotated by the microprocessor 56 during motor spin up, the friction force becomes dynamic, rather than static. This dynamic friction force is less than the static friction force, and the magnetic force is greater than the dynamic friction force. Thus, as the spindle 60 is rotated, the friction force decreases, the magnetic force overcomes the decreasing friction force and the hub 26 moves to a position where it is centered over the spindle 60 due to the magnetic force. As the hub 26 moves to the centered position, the spindle 32 can move into the aperture 28 and engage the hub 26.

The programmed code of this prior art design controlled the microprocessor 56 to spin up the spindle 60 of the disk drive motor 30 relatively rapidly. Typically, the spindle 60 would spin up to its operating speed in less than about 2 seconds. The operating speed of the spindle 60 may be about 2491 rpm.

As described above, the spindle motor 30 of the improved disk drive 12 shown in FIGS. 3 and 7 does not have a conical shape 60. Due to design constraints imposed on the height of the disk drive 12, the conical shaped end 60 of the spindle motor 30 could not be included within the disk drive 12 shown in FIGS. 3 and 4. For instance, one design constraint of recently developed disk drives is the height of the disk drive 12. In order to ensure the height of the disk drive 12 is below the desired height, the disk drive spindle motor 30 had to have a smaller height. Because of the smaller height imposed on the disk drive spindle motor 30, the spindle 32 could not extend far enough above the motor 30 to have a conical shape 60. Rather, the spindle 32 of this disk drive motor 30 has a dome shape, as opposed to a conical shape 60.

Similar to the prior art disk drive spindle motors, when the dome shaped spindle is in the loaded position, it may not be centered with respect to the aperture 28 and the hub 26, as shown in FIG. 10. Also, akin to the prior art conical shaped spindle 32, if the hub 26 is not centerd in the loaded position, the magnet 39 of the disk drive motor will pull the hub 26 towards a centered position and the hub 26 may contact the dome shaped spindle. In this event friction, and in particular static friction, between the hub 26 and the spindle 32 will prevent the hub 26 from moving to the centered position. Experience has shown if the prior art "spin-up" routine is applied to the dome shaped spindle 32 the dome shaped spindle 32 may not become centered with respect to the hub 26 and enter the aperture 28. The reason the hub 26 may not move to a centered position if this prior art spin up routine is applied is because the friction force between the dome shaped spindle 32 and the hub 26 is greater than the friction force between the conical shaped spindle 60 and the hub 26. Thus, when the dome shaped spindle 32 is spun up with the prior art spin up routine, the friction force will decrease, but it must decrease more in order for it to be overcome by the magnetic force of the magnet 39. Before the friction force has decreased to the point where it can be overcome by the magnetic force, centrifugal force exerted by the rotation of the spindle 32 may prevent the hub 26 from moving to a centered position. This occurs because with the prior art spin up routine the spindle 32 is being spun up relatively rapidly, and the centrifugal force exerted by the spindle 32 will push the hub 26 away from the spindle 32. More particularly, before the magnetic force can overcome the friction force, the centrifugal force exceeds the magnetic force. This prevents the hub 26 from moving to the centered position so that the spindle 32 can enter the aperture 28 and properly engage the hub 26. Alternatively stated, the centrifugal force, which is a function of the rotating speed, prevents the hub 26 from becoming centered due to the magnetic force. With the conical shaped spindle 60, the friction force was less so that the magnetic force could overcome the friction force before the centrifugal force was great enough to prevent that from happening.

The rotational speed at which the centrifugal force is great enough to prevent the hub 26 from becoming centered may be referred to as the "critical speed." This critical speed for the dome shaped spindle is about 1000 rpm. At are above this critical speed, the dome shaped spindle 32 may not enter the aperture 28 and properly engage the hub 26 of the disk cartridge 10 when it contacts the hub 26.

What has been described thus far is not part of the novelty of this invention, but rather can be combined with this invention. The present invention ensures that the dome shaped spindle motor 30 of the disk drive 12 properly engages the hub 26 of the disk cartridge 10. According to a preferred embodiment of this invention, a system 34 for ensuring that a disk drive motor 30 is properly engaged with a hub 26 of a disk cartridge 10 includes a microprocessor 56, a computer programmable memory 58 or storage device and the disk drive 12 described above. The memory 58 controls the microprocessor 56 to spin up the motor 30 in a controlled manner, so that the hub 26 of the disk cartridge becomes centered with respect to the dome shaped spindle 32, and the spindle 32 properly engages the hub 26 of the disk cartridge 10.

In a preferred embodiment of this invention, the memory 58 contains programmed code and data which control the microprocessor 56. The microprocessor 56 controls the spindle motor 30 to spin up so that the magnetic force of the magnet can move the hub 26 of the disk cartridge 10 to a centered position with respect to the spindle 32. A first preferred embodiment of this invention uses dynamic braking to properly center and engage the spindle motor 30 with the hub 26 of the disk cartridge 10. Initially, the memory 58 controls the microprocessor 56 to determine if a disk cartridge 10 has been inserted into the disk drive 12. This can be done in a variety of ways including an electrical circuit 57 that including but not limited to detecting the presence of a retroreflective marker disposed on the disk cartridge.

If the microprocessor 56 determines that a disk cartridge 10 has been inserted into the disk drive 12, then the memory 58 controls the microprocessor 56 to spin up the motor 30 as follows. The motor 30 is first rotated in a first direction. The memory 58 then controls the microprocessor 56 to detect motion of the spindle motor 30. This may be done electronically, by for example counting commutations between the spindle motor 30 and the microprocessor 56. Alternatively, actual motion of the spindle motor 30 can be detected. After motion is detected, the memory 58 controls the microprocessor 56 to apply a dynamic braking force to the spindle motor 30. Preferably, the microprocessor 56 applies the dynamic braking force by activating a transistor or a group of transistors to short the leads of the motor 30 together. This generates a force which slows the motor 30. In a preferred embodiment of this invention, the dynamic braking force is applied for about 0.5 seconds.

If the spindle 32 does not enter the aperture 28 when it moves to the loaded position as shown in FIG. 9, the method of this invention ensures that the spindle 32 enters the aperture 28 to properly engage the hub 26 as follows. By slowing the rotational speed of the spindle motor 30, the amount of time that it takes for the spindle motor 30 to reach the critical speed increases. As the spindle 32 rotates at the slower speed, the centrifugal force is relatively less in relation to the higher speeds achieved with the prior art spin up routine. Because of the lower centrifugal force, the magnetic force is able to overcome the decreasing frictional force, the dynamic friction force, and pull the hub 26 to the centered position with respect to the spindle 32. As the hub 26 moves towards the centered position, the spindle 32 enters the aperture 28 and properly engages the hub 26. Thus, because of the dynamic braking force the spindle motor 30 engages the hub 26 at a rotational speed that is less than the critical speed. At this lower speed, the spindle 32 can properly engage the hub 26, because the hub 26 is centered over the spindle 32.

In a preferred embodiment of this invention, the dynamic braking force is great enough to completely stop the spindle 32 from rotating. However, this invention is not limited to this embodiment and the dynamic braking force need only slow the spindle 32 so that the magnetic force can overcome the friction force without the centrifugal force preventing this from happening.

After the dynamic braking force has been applied for a predetermined period of time and the spindle motor 30 has engaged the hub 26 of the disk cartridge 10, the memory 58 controls the microprocessor 56 to rotate the spindle motor 30 at its operational speed.

In a second preferred embodiment of this invention, the memory 58 contains different programmed code and data which control the microprocessor 56 and the spindle motor 30. The code and data in this embodiment control the microprocessor 56 to rotate the spindle motor 30 until it reaches a predetermined speed, which is below the critical speed. In a preferred embodiment of this invention, this predetermined speed is about 60 rpm. However, other speeds may be used, as long as they are below the critical speed. Once this predetermined speed is reached, the microprocessor 56 rotates the spindle motor 30 at this predetermined speed for a predetermined period of time. In a preferred embodiment of this invention, the predetermined period of time is equal to about 1.0 seconds. After rotating the disk drive motor 30 at this predetermined speed, the memory 58 controls the microprocessor 56 to speed up the motor 30 to its operating speed. By holding the spindle's speed of rotation at a speed that is less than the critical speed, the magnetic force of the magnet can overcome the decreasing friction force and move the hub 26 to the centered position with respect the spindle 32. As the hub 26 moves towards the centered position, the spindle 32 enters the aperture 28 and engages the hub 26. Once centered, the spindle motor 30 can then be brought up to its operating rotational speed by the memory 58 and the microprocessor 56. As it is spun up, to its operational speed the spindle 32 contacts the hub 26 to drive rotate the hub and the storage medium.

There are many alternative ways in which to hold the motor 30 speed at a predetermined speed for a predetermined time. In a preferred embodiment, this is done electronically be counting commutations. However, other means may be employed.

Although the preferred methods and systems of this invention are described with respect to a specific disk drive 12, a specific disk cartridge 10 and a specific shape of a spindle motor 30, this invention is not intended to be limited to this disk drive 12, disk cartridge 10 and spindle 32 shape. Rather, this invention can be used with a variety of disk drives, disk cartridges and spindle motors.

In summary, the system and method of this invention ensure that a hub 26 of a disk cartridge 10 is centered with respect to a spindle 32 of a disk drive motor 30, so that when the spindle 32 is rotated it will properly engage the hub 26 to rotate the storage medium. This invention achieves this by slowing the spindle 32 as it is being spun up. By slowing the spindle 32, the magnetic force of the magnet 39 of the disk drive motor 30 can overcome the friction force and move the hub 26 to a centered position before the centrifugal force from the rotation of the spindle 32 is great enough to prevent this from occurring. As the hub 26 moves towards the centered position, the spindle 32 can enter the aperture 28 and properly engage the hub 26.

The preferred embodiments described herein are illustrative only and, although the examples given include many specifics, they are intended as illustrative of only one possible embodiment of the invention. Other embodiments and modifications will, no doubt, occur to those skilled in the art. Thus, the examples given should only be interpreted as illustrations of some of the preferred embodiments of the invention, and the full scope of the invention should be determined by the appended claims and their legal equivalents.

What is claimed is:

1. A method of engaging a spindle of a disk drive motor with a hub of a disk cartridge, the disk drive motor being disposed in a disk drive and having a magnet, the magnet exerting a force on the hub of the disk cartridge when the disk cartridge is inserted into the disk drive that pulls the hub to a centered position with respect to the spindle, comprising:

inserting the disk cartridge into the disk drive;

rotating the spindle of the disk drive motor; and electronically applying a braking force to the spindle, so that the magnet can move the hub to a centered position with respect to the spindle of the disk drive motor.

2. The method of claim 1, wherein the braking force comprises a dynamic braking force.

3. The method of claim 1, further comprising moving the spindle motor from an unloaded position to a loaded position.

4. The method of claim 1, wherein the disk drive spindle motor comprises a spindle that has a dome shaped end.

5. The method of claim 1, further comprising detecting the presence of the disk cartridge in the disk drive.

6. The method of claim 1, further comprising rotating the spindle at an operational rotational speed.

7. The method of claim 1, where the magnet is mounted around the spindle.

8. The method of claim 1, wherein applying the braking force comprises shorting leads of the disk drive motor together.

9. The method of claim 1, further comprising detecting rotation of the spindle after the spindle has been rotated and then applying the braking force.

10. The method of claim 9, wherein detecting rotation of the spindle comprises counting commutations between the disk drive motor and a microprocessor.

11. A method of engaging a spindle of a disk drive motor with a hub of a disk cartridge, the disk drive motor being disposed in a disk drive and having a magnet, the magnet exerting a force on the hub of the disk cartridge when the disk cartridge is inserted into the disk drive that pulls the hub to a centered position with respect to the spindle, comprising:

inserting the disk cartridge into the disk drive;

rotating the spindle of the disk drive motor; and electronically reducing the rotational speed of the spindle, so that the magnet can move the hub to a centered position with respect to the spindle of the disk drive motor.

12. The method of claim 11, wherein reducing the rotational speed of the spindle comprises applying a dynamic braking force to the spindle motor.

13. The method of claim 11, further comprising moving the disk drive motor from an unloaded position to a loaded position.

14. The method of claim 11, wherein the disk drive motor comprises a spindle that has a dome shaped end.

15. The method of claim 11, further comprising detecting the presence of the disk cartridge in the disk drive.

16. The method of claim 11, further comprising the step of rotating the spindle at an operational rotational speed.

17. The method of claim 11, wherein electronically reducing the rotational speed of the spindle comprises applying an electronic force to the disk drive motor that slows the rotation of the disk drive motor.

18. The method of claim 11, wherein electronically reducing the rotational speed of the spindle comprises shorting leads of the disk drive motor together.

19. The method of claim 11, wherein the magnet is mounted around the spindle.

20. The method of claim 11, further comprising detecting rotation of the spindle after the spindle has been rotated and then applying a braking force.

21. The method of claim 20, wherein detecting rotation of the spindle comprises counting commutations between the disk drive motor and a microprocessor.

22. A method of engaging a spindle of a disk drive motor with a hub of a disk cartridge, the disk drive motor being disposed in a disk drive and having a magnet, the magnet exerting a force on the hub of the disk cartridge when the disk cartridge is inserted into the disk drive that pulls the hub to a centered position with respect to the spindle, comprising:

inserting the disk cartridge into the disk drive; and rotating the spindle of the spindle motor at a speed that is less than a critical speed for a predetermined time so that the magnet can move the hub of the disk cartridge into a centered position with respect to the spindle of the disk drive motor, the critical speed being a speed where the magnetic attraction force between the spindle and the hub overcomes the centrifugal force of the rotating spindle; and rotating the spindle motor at an operational speed that is greater than the critical speed.

23. The method of claim 22, further comprising detecting the presence of the disk cartridge in the disk drive prior to rotating the spindle of the spindle motor at a speed that is less than the critical speed.

24. The method of claim 22, further comprising moving the spindle motor from an unloaded position to a loaded position.

25. The method of claim 22, wherein the spindle motor comprises a spindle that has a dome shaped end.

26. The method of claim 22, wherein the magnet is mounted around the spindle.

* * * * *